(12) United States Patent
Staley, III et al.

(10) Patent No.: US 7,230,684 B2
(45) Date of Patent: Jun. 12, 2007

(54) METHOD AND APPARATUS FOR RANGE FINDING WITH A SINGLE APERTURE

(75) Inventors: John R. Staley, III, Dallas, TX (US); Frank C. Sulzbach, Dallas, TX (US)

(73) Assignee: Raytheon Company, Waltham, MA (US)

( * ) Notice: Subject to any disclaimer, the term of this patent is extended or adjusted under 35 U.S.C. 154(b) by 352 days.

(21) Appl. No.: 10/962,134

(22) Filed: Oct. 7, 2004

(65) Prior Publication Data

US 2005/0200831 A1    Sep. 15, 2005

Related U.S. Application Data

(60) Provisional application No. 60/552,269, filed on Mar. 10, 2004.

(51) Int. Cl.
*G01C 3/08* (2006.01)
(52) U.S. Cl. .............................. 356/4.01; 42/132
(58) Field of Classification Search .............. 356/4.01
See application file for complete search history.

(56) References Cited

U.S. PATENT DOCUMENTS

| | | | |
|---|---|---|---|
| 3,790,278 A | | 2/1974 | Buczek et al. |
| 4,729,647 A | | 3/1988 | Goldmunz et al. |
| 5,110,207 A | * | 5/1992 | Harris .................. 356/5.09 |
| 5,329,347 A | | 7/1994 | Wallace et al. |
| 5,517,297 A | | 5/1996 | Stenton et al. |
| 5,774,208 A | | 6/1998 | Abe et al. |
| 6,130,754 A | | 10/2000 | Greene et al. |
| 6,624,402 B2 | * | 9/2003 | Kaneko et al. .......... 250/201.2 |
| 6,903,820 B2 | * | 6/2005 | Wang ....................... 356/369 |
| 2003/0161019 A1 | * | 8/2003 | Zhang et al. ............... 359/27 |
| 2004/0196557 A1 | * | 10/2004 | Takeda ..................... 359/579 |

FOREIGN PATENT DOCUMENTS

| | | | |
|---|---|---|---|
| DE | 2536956 | | 2/1977 |
| EP | 0188393 | | 7/1986 |
| EP | 0425386 | | 6/1991 |
| EP | 0709705 | | 5/1996 |
| FR | 2344807 | | 10/1977 |
| FR | 7261162 | | 9/1998 |
| GB | 1505314 | | 3/1978 |
| GB | 2336493 A | * | 10/1999 |
| RU | 2228517 | | 5/2004 |
| WO | WO 2004/048891 | | 6/2004 |

* cited by examiner

*Primary Examiner*—Thomas H. Tarcza
*Assistant Examiner*—Tim Brainard
(74) *Attorney, Agent, or Firm*—Haynes and Boone, LLP

(57) ABSTRACT

An apparatus has a rangefinder portion that includes: a radiation generator which emits radiation having a selected wavelength; a radiation detector which detects radiation having the selected wavelength; and an optical portion which includes a non-reciprocal optical part. The optical portion routes radiation emitted by the radiation generator at the selected wavelength through the non-reciprocal optical part and then through an aperture toward a location remote from the apparatus, and also routes radiation received via the aperture at the selected wavelength through the non-reciprocal optical part and then to the radiation detector.

19 Claims, 3 Drawing Sheets

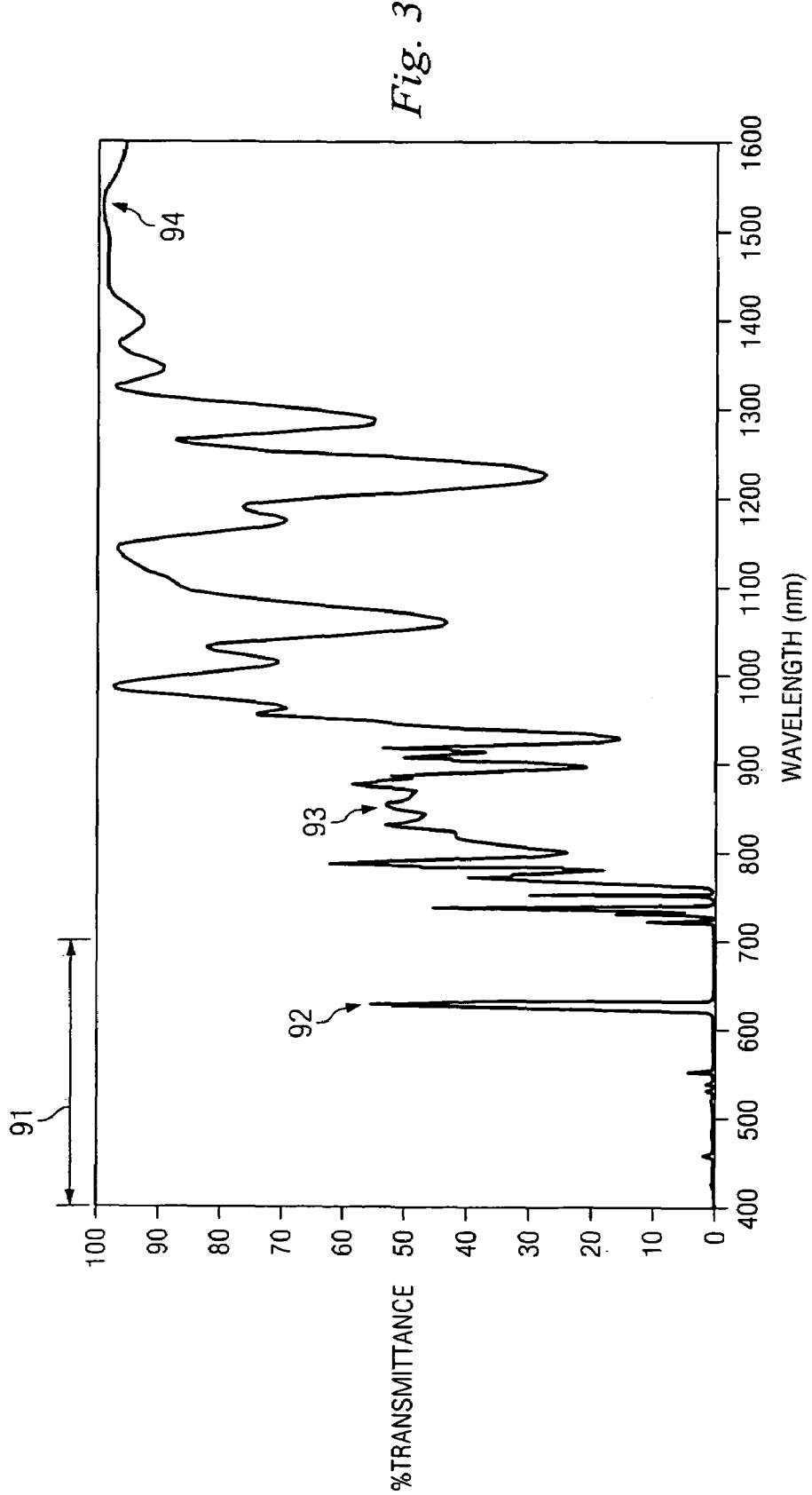

METHOD AND APPARATUS FOR RANGE FINDING WITH A SINGLE APERTURE

This application claims the priority under 35 U.S.C. §119 of provisional application No. 60/552,269 filed Mar. 10, 2004.

TECHNICAL FIELD OF THE INVENTION

This invention relates in general to rangefinders and, more particularly, to rangefinders that can be integrated into an optical weapon sight.

BACKGROUND OF THE INVENTION

Optical sights are used for various purposes. One example is that an optical sight can be mounted on a weapon, in order to help a user accurately aim the weapon. The optical sight accepts image information from a distance scene, and presents this image information within a field of view that is visible to the eye of a user.

In some applications, it would be desirable to integrate into the sight a rangefinder, such as a laser rangefinder, so that the user will have a tool for making an accurate determination of the distance to an actual scene or target of interest. Although various possible approaches to laser rangefinders have previously been proposed, they have not been satisfactory in all respects. For example, one possible approach would be to use separate optical apertures for the outgoing laser pulse and the incoming reflected pulse, in order to obtain high optical efficiency. In particular, in a configuration that used a single aperture and a beam splitter for the laser energy, optical energy would be lost, due to the beam splitter. Another possible approach would be to time-division multiplex the transmission optics between the laser which generates the outgoing pulse and the detector which receives the incoming reflected pulse. This approach would require a high-speed optical switch, along with high-speed and potentially high-voltage electronics to drive the switch. However, suitable high-speed optical switching technology is not readily available. Moreover, and in any event, the switches and circuits would significantly increase the size, cost and weight of any weapon sight, and would also significantly increase power consumption, so as to seriously degrade the effective battery life of a portable sight.

SUMMARY OF THE INVENTION

One form of the invention involves effecting range finding by: emitting radiation having a selected wavelength from a radiation generator; detecting radiation having the selected wavelength with a radiation detector; routing radiation emitted by the radiation generator at the selected wavelength through a non-reciprocal optical part and then through an aperture toward a remote location; and routing radiation received via the aperture at the selected wavelength through the non-reciprocal optical part and then to the radiation detector.

BRIEF DESCRIPTION OF THE DRAWINGS

A better understanding of the present invention will be realized form the detailed description which follows, taken in conjunction with the accompanying drawings, in which:

FIG. 3 is a graph depicting a curve that represents the transmittance in the visible and infrared spectrums of a thin-film filter which is a component of the sight of FIG. 1.

DETAILED DESCRIPTION

Figure 1:
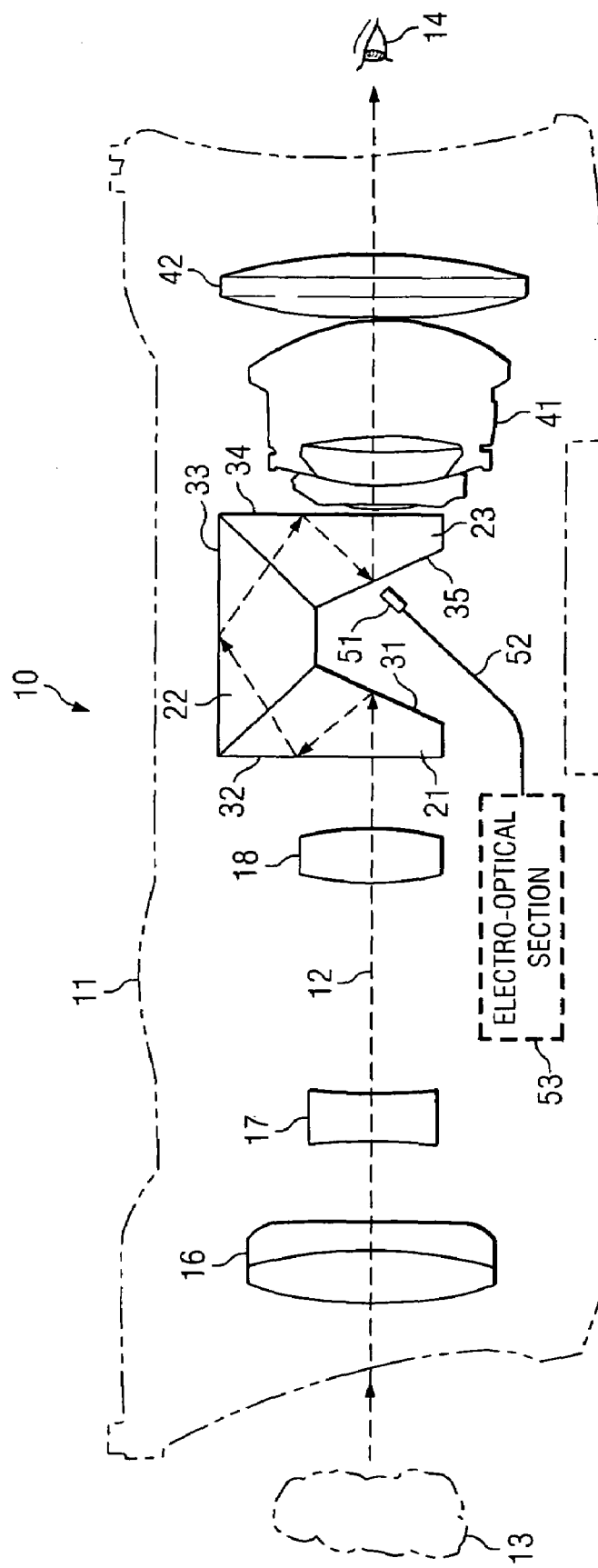
FIG. 1 is a diagrammatic view of an apparatus which is an optical sight for a weapon, and which embodies aspects of the present invention.

FIG. 1 is a diagrammatic view of an apparatus which is an optical sight 10 for a weapon, and which embodies aspects of the present invention. The sight 10 could be mounted on a rifle, in order to assist a user in aiming the rifle at a target within a remote scene 13. The scene 13 could be any of a wide variety of different things, and is therefore depicted diagrammatically in FIG. 1 by a broken line. FIG. 1 does not depict all of the structure of the sight 10, but only selected components that facilitate an understanding of the present invention.

The sight 10 has a housing, which is represented diagrammatically in FIG. 1 by a broken line 11. Another broken line 12 represents a path of travel through the sight 10 of visible radiation which embodies an optical image of the remote scene 13. This radiation from the scene 13 travels along the path 12 to an eye 14 of a user.

The sight 10 has an objective lens doublet 16, and two removable lenses 17 and 18. The lens doublet 16 defines an optical aperture for the sight 10, and the removable lenses 17 and 18 determine the magnification of the sight 10. The sight 10 also has a prism assembly which includes three prisms 21–23. The prisms 21–23 have surfaces 31–35, and each of these surfaces has at least a portion thereof covered by a reflective coating. For clarity, the coatings are not separately shown in FIG. 1. The coatings on the surfaces 31–34 are each a type of coating which is well known in the art. The coating on the surface 35 is described in more detail later. Radiation from the scene 13 propagates along the path of travel 12, passes successively through the lens doublet 16 and the lenses 17–18, and then passes successively through the prisms 21–23, while being successively reflected at each of the surfaces 31–35.

The sight 10 also has a lens assembly 41, and a lens 42. After exiting the prism 23, radiation that is propagating along the path of travel 12 passes successively through the lens assembly 41 and lens 42, and then travels to the eye 14 of the user.

Figure 2:
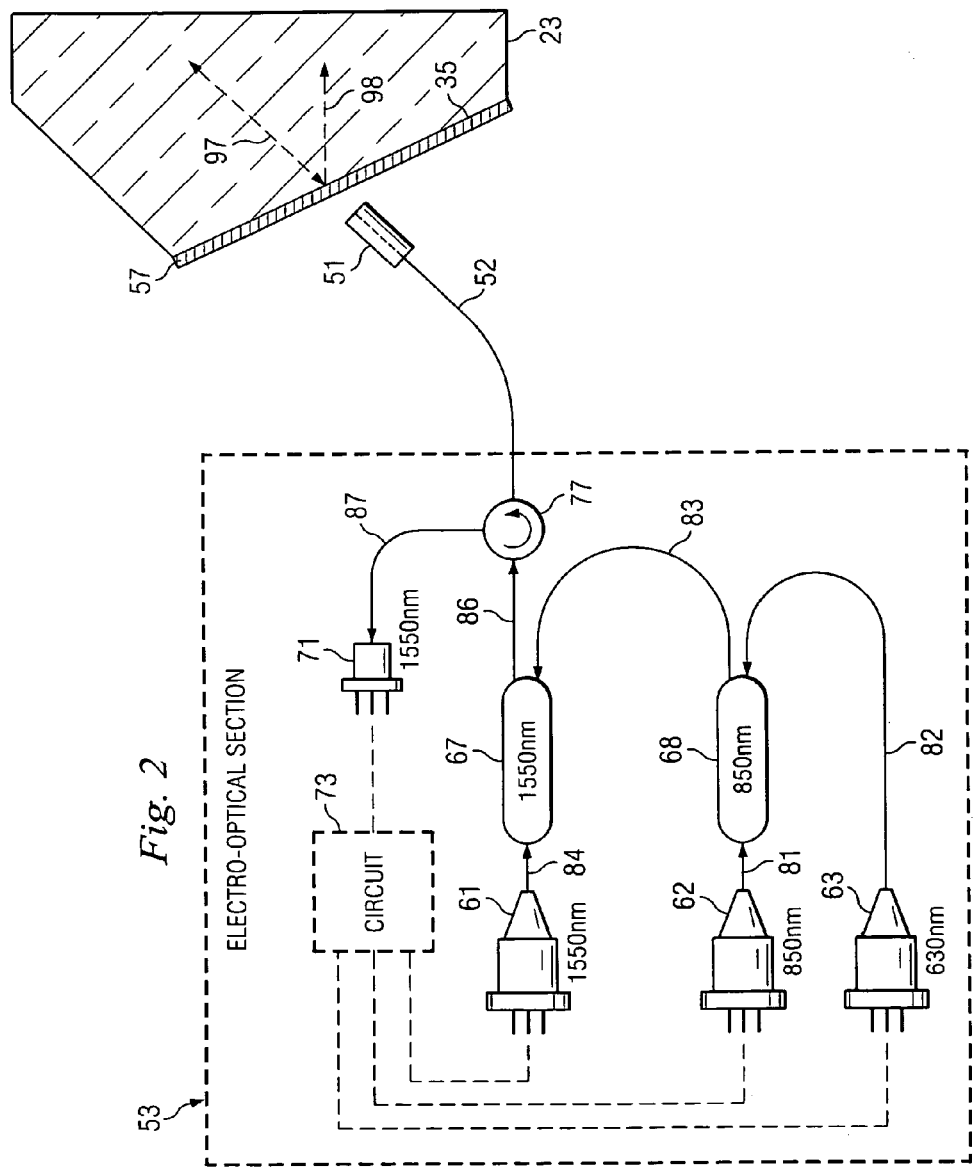
FIG. 2 is a diagrammatic sectional side view of a portion of the sight of FIG. 1, in a significantly enlarged scale.

The sight 10 includes a ferrule 51, which is fixedly supported near the surface 35 of the prism 23. The ferrule stationarily supports one end of a single-mode optical fiber 52, so that the end of the fiber extends at a selected angle with respect to the surface 35 of the prism 23. The sight 10 also includes an electro-optical section 53, which is in optical communication with the end of the fiber 52 remote from the ferrule 51. The electro-optical section 53 is shown in more detail in FIG. 2. In particular, FIG. 2 is a diagrammatic sectional side view of a portion of the sight 10 of FIG. 1, in a significantly enlarged scale. FIG. 2 shows the prism 23, the ferrule 51, the optical fiber 52, and a block diagram of the electro-optical section 53.

As mentioned above, a coating is provided on the surface 35 of the prism 23, and this coating is shown at 57 in FIG. 2. In the disclosed embodiment, and as explained earlier, the coating 57 is a more sophisticated coating than the coatings which are provided on the other prism surfaces 31–34 (FIG. 1). In particular, the coatings provided on the surfaces 31–34 are coatings of a type known in the art, and are each highly reflective to all radiation within both the visible and infrared spectrums. In contrast, the coating 57 on the surface 35 is more sophisticated than the coatings which are provided on the surfaces 31–34, and is described in detail later. For now, it is sufficient to briefly explain that the coating 57 is a thin-film filter, and that the thin-film filter 57 is designed to have certain selected characteristics for radiation at three specific wavelengths, as follows.

First, for infrared radiation with a wavelength of 1550 nm, the filter 57 has a transmittance of at least about 80%. In the disclosed embodiment, the transmittance for infrared radiation with a wavelength of 1550 nm is nearly 100%. Second, for infrared radiation with a wavelength of 850 nm, the filter 57 has a transmittance in the range of approximately 30% to 70%, and a reflectance in the range of approximately 70% to 30%. In the disclosed embodiment, the transmittance and reflectance for the wavelength of 850 nm are each approximately 50%. Third, the filter has a reflectance for all radiation in the visible spectrum which is at least about 80%, and nearly 100% in the disclosed embodiment, except for a narrow band of visible radiation centered at a wavelength of about 630 nm. As to visible radiation with a wavelength of approximately 630 nm, the filter 57 has a transmittance in the range of approximately 30% to 70%, and a reflectance in the range of approximately 70% to 30%. In the disclosed embodiment, the transmittance and reflectance for the wavelength of 630 nm are each approximately 50%.

The electro-optical section 53 includes three laser diodes 61–63, which are each a commercially-available device that is well known to persons skilled in the art. The laser diode 61 outputs a laser beam of infrared radiation with a wavelength of 1550 nm, the laser diode 62 outputs a laser beam of infrared radiation with a wavelength of 850 nm, and the laser diode 63 outputs a laser beam of visible radiation with a wavelength of 630 nm. As discussed in more detail later, the radiation from the laser diode 61 is used for laser range finding, the radiation from the laser diode 62 is used as an infrared pointer, and the radiation from the laser diode 63 is used as a visible pointer.

The electro-optical section 53 includes two wavelength division multiplexers 67 and 68, which each have three optical ports. These multiplexers are devices of a type known in the art, and can be purchased commercially, for example from Oplink Communications, Inc. of San Jose, Calif., and/or the ATI Optique division of ATI Electronique of Courcouronnes, France. The multiplexer 67 is transmissive to infrared radiation having a wavelength of 1550 nm, and is reflective to certain radiation having somewhat shorter wavelengths, including infrared radiation having a wavelength of 850 nm, and also visible radiation having a wavelength of 630 nm. The multiplexer 68 is transmissive to infrared radiation having a wavelength of 850 nm, and is reflective to certain radiation having somewhat shorter wavelengths, including visible radiation having a wavelength of 630 nm. The electro-optical section 53 also includes an infrared detector 71, which is a commercially-available component. The infrared detector 71 is responsive to infrared radiation having a wavelength of 1550 nm. The laser diodes 61–63 and the detector 71 are each operably coupled to a control circuit, which is shown diagrammatically at 73.

The electro-optical section 53 includes a non-reciprocal optical element which, in the disclosed embodiment, is a commercially-available three-port circulator 77. The circulator 77 is optimized for a wavelength of 1550 nm, but also happens to have, for each of the wavelengths of 850 nm and 630 nm, a relatively high transmittance. A circulator suitable for use at 77 can be obtained commercially from Oplink Communications, Inc. of San Jose, Calif.

A single-mode optical fiber 81 couples the output of the laser diode 62 to an input port of the multiplexer 68, and a different single-mode optical fiber 82 couples the output of the laser diode 63 to another input port of the multiplexer 68. A single-mode optical fiber 83 couples an output port of the multiplexer 68 to an input port of the multiplexer 67, and a single-mode optical fiber 84 couples the output of the laser diode 61 to an input port of the multiplexer 67. A single-mode optical fiber 86 couples an output port of the multiplexer 67 to an input port of the circulator 77, and a single-mode optical fiber 87 couples an output port of the circulator 77 to an input of the detector 71. The end of the optical fiber 52 remote from the ferrule 51 is coupled to a further port of the circulator 77.

Turning now in more detail to the thin-film filter 57, the filter 57 has a plurality of thin layers of different materials, which are selected and ordered so that the filter 57 has certain specific properties with respect to radiation impinging at selected angles onto either side of the filter 57. In more detail, the filter 57 in the disclosed embodiment has 140 layers. As discussed above, the filter 57 is configured to be highly transmissive to infrared radiation with a wavelength of 1550 nm, and to have a transmittance and reflectance of approximately 50% for infrared radiation with a wavelength of 850 nm. Further, the filter 57 is configured to be highly reflective to virtually all visible radiation, except for visible radiation falling within a narrow passband which is centered at a wavelength of 630 nm, and which has a width of approximately 4 nm. As to visible radiation with a wavelength of approximately 630 nm, which falls within this passband, the filter 57 has a transmittance and reflectance of approximately 50%.

FIG. 3 is a graph depicting a curve that represents the transmittance of the filter 57, across a spectrum which includes visible and infrared radiation. As indicated at 91, the visible spectrum ranges from approximately 400 nm to approximately 700 nm, and it will be noted that the filter 57 is highly reflective to all wavelengths of visible radiation, except for a narrow passband 92 centered at 630 nm, where the filter 57 has a transmittance of approximately 50%, and thus a reflectance of approximately 50%. In the disclosed embodiment, the passband 92 has a width of approximately 4 nm. Reference numeral 93 identifies the wavelength of 850 nm, where the filter 57 has a transmittance of approximately 50% and thus also a reflectance of approximately 50%. Reference numeral 94 identifies the wavelength of 1550 nm, where the filter 57 has a transmittance of nearly 100%.

Although the filter 57 in the disclosed embodiment is configured to have certain characteristics at the selected wavelengths of 630 nm, 850 nm, and 1550 nm, it would alternatively be possible to use other wavelengths. Further, even though the filter 57 in the disclosed embodiment has a passband 92 with a width of approximately 4 nm, the passband could alternatively have some other suitable width. For example, the advantages of a relatively narrow passband such as 4 nm may justify the added manufacturing cost in some applications, whereas a wider passband such as 8 nm can be made at a lower cost and may be adequate for other applications.

The following is the specific prescription for the exemplary 140-layer thin-film filter 57 in the disclosed embodiment, using a notation form which is well known to those skilled in the art:

| | | | | | | | |
|---|---|---|---|---|---|---|---|
| 1 | .87417D | 2 | .93707Q | 3 | .59373D | 4 | .68729Q |
| 5 | .84367D | 6 | .86474Q | 7 | .69571D | 8 | .80691Q |
| 9 | .68922D | 10 | .94277Q | 11 | .95296D | 12 | .96184Q |
| 13 | .84188D | 14 | .90343Q | 15 | .88798D | 16 | .94453Q |
| 17 | .91814D | 18 | .9222Q | 19 | .82828D | 20 | .88612Q |
| 21 | .89998D | 22 | .9322Q | 23 | .83963D | 24 | .62469Q |
| 25 | .53525D | 26 | .83988Q | 27 | .80437D | 28 | .65889Q |
| 29 | .66428D | 30 | .77243Q | 31 | .77065D | 32 | .62333Q |
| 33 | .60079D | 34 | .85563Q | 35 | .9025D | 36 | .54333Q |
| 37 | .69335D | 38 | .8133Q | 39 | .69358D | 40 | .66139Q |
| 41 | .61176D | 42 | .83722Q | 43 | .92406D | 44 | .61004Q |
| 45 | .66767D | 46 | .59076Q | 47 | .73681D | 48 | .7168Q |
| 49 | .45866D | 50 | 1.08G | 51 | .74794D | 52 | .93892Q |
| 53 | 1.08487D | 54 | 1.0855Q | 55 | 1.0094D | 56 | 1.08479Q |
| 57 | 1.03634D | 58 | 1.08205Q | 59 | 2.06169D | 60 | 1.09419Q |
| 61 | 1.04682D | 62 | 1.09012Q | 63 | 1.03303D | 64 | 1.11933Q |
| 65 | 1.06649D | 66 | 1.03346Q | 67 | 1.2058D | 68 | 1.44909Q |
| 69 | 1.06938D | 70 | 1.09292Q | 71 | 1.06419D | 72 | 1.09073Q |
| 73 | 1.03179D | 74 | 1.08894Q | 75 | 1.03547D | 76 | 1.08318Q |
| 77 | 6.21126D | 78 | 1.08677Q | 79 | 1.03211D | 80 | 1.08539Q |
| 81 | 1.04187D | 82 | 1.08426Q | 83 | 1.02083D | 84 | 1.16822Q |
| 85 | 1.20809D | 86 | 1.1466Q | 87 | 1.0841D | 88 | 1.20698Q |
| 89 | 1.08544D | 90 | 1.1133Q | 91 | 1.07304D | 92 | 1.11622Q |
| 93 | 1.0515D | 94 | 1.10198Q | 95 | 10.36312D | 96 | 1.09983Q |
| 97 | 1.05013D | 98 | 1.10794Q | 99 | 1.03736D | 100 | 1.06045Q |
| 101 | 1.02806D | 102 | 1.03392Q | 103 | .76535D | 104 | .88209Q |
| 105 | 1.04362D | 106 | 1.04018Q | 107 | 1.05205D | 108 | 1.15664Q |
| 109 | 1.07093D | 110 | 1.10304Q | 111 | 1.04894D | 112 | 1.09883Q |
| 113 | 6.2272D | 114 | 1.09448Q | 115 | 1.05137D | 116 | 1.10979Q |
| 117 | 1.04732D | 118 | 1.12319Q | 119 | 1.09733D | 120 | .9596Q |
| 121 | .76689D | 122 | 1.47182Q | 123 | 1.23068D | 124 | .82947Q |
| 125 | 1.12015D | 126 | 1.16279Q | 127 | 1.01184D | 128 | 1.07944Q |
| 129 | 1.05393D | 130 | 1.10461Q | 131 | 2.09452D | 132 | 1.09515Q |
| 133 | 1.04623D | 134 | 1.08607Q | 135 | .97473D | 136 | 1.07056Q |
| 137 | 1.19518D | 138 | .91173Q | 139 | .69818D | 140 | 1.76913Q |

In the foregoing prescription, the layer numbers are not part of the prescription itself, but instead are provided for clarity. Layer 1 is at the side of the filter 57 located adjacent the surface 35 of the glass prism 23, and layer 140 is at the opposite side of the filter 57. The prescription assumes that the prism 23 is made from a glass material having a refractive index of 1.52, and assumes that the prism is sufficiently thick so that the opposite side of the prism can be effectively ignored. The prescription is configured for random polarization, with incidence on the filter in glass at an angle of 22.5° from a reference line perpendicular to the filter, and with incidence on the filter in air at an angle of 35.6° (and then exiting into the glass prism).

In the prescription, each "D" and each "Q" represents a respective layer with an optical thickness of one-quarter wavelength at normal incidence for the design wavelength of 630 nm. The number preceding each "D" or "Q" is a coefficient that represents a thickness adjustment. The "D" layers have a refractive index of 2.1 and can, for example, be implemented with tantalum pentoxide. The "Q" layers have a refractive index of 1.444 and can, for example, be implemented with silicon dioxide. The exact values may vary slightly in dependence on fabrication considerations, such as the method of deposition, residual gases, and rates of deposition. Alternatively, other high-index coating materials could be used with similar scalable results, including niobium pentoxide, zirconium oxide, and/or titanium dioxide.

It is emphasized that the foregoing prescription for the filter 57 is merely one possible way of implementing the filter 57. The invention encompasses this approach, as well as any other suitable approach.

An explanation will now be provided of how the disclosed system operates. With reference to FIG. 1, visible radiation which originates from the scene 13 propagates along the path of travel 12, traveling through the lenses 16–18, the prisms 21–23, and the lenses 41–42, until it reaches the eye 14 of a user. As shown at 91 in FIG. 3, the filter 57 is highly reflective to all visible radiation, except that it has a reflectance of approximately 50% for the narrow passband 92 which is centered at the wavelength of 630 nm. Thus, to the extent that radiation within the visible spectrum 91 (FIG. 3) impinges on the filter 57 along the portion 97 (FIG. 2) of the path 12, almost all of this visible radiation will be reflected by the filter 57 and will then travel along the portion 98 of the path 12 to the eye 14 (FIG. 1) of the user. The exception is that only about 50% of the radiation within the passband 92 will be reflected, and the other 50% will pass through the filter 57 and effectively be lost or ignored.

In FIG. 2, the laser dioxide 63 outputs visible radiation with a wavelength of 630 nm, which is virtually completely reflected into the optical fiber 83 by the multiplexer 68. Infrared radiation emitted by the laser diode 62 at a wavelength of 850 nm is passed through the multiplexer 68 with a high level of efficiency, and enters the optical fiber 83. Thus, the multiplexer 68 efficiently combines or multiplexes the radiation at wavelengths of 630 nm and 850 nm, and transmits this combined radiation through the optical fiber 83. When this combined radiation reaches the multiplexer 67, the multiplexer 67 effects almost a complete reflection of this radiation into the optical fiber 86. The laser diode 61 emits infrared radiation with a wavelength of 1550 nm, which passes through the multiplexer 67 with a high degree of efficiency, and enters the optical fiber 86. Thus, the multiplexer 67 efficiently combines or multiplexes the radiation at all three wavelengths of 630 nm, 850 nm and 1550 nm.

The combined radiation with these three wavelengths propagates through the optical fiber 86 until it reaches the circulator 77, where it is passed with a high degree of efficiency into the optical fiber 52, and then travels to the filter 57. When this combined radiation reaches the filter 57, each wavelength is treated separately. In particular, nearly 100% of the infrared radiation at the wavelength of 1550 nm will pass through the filter 57 and enter the prism 23. As to the radiation at each of the wavelengths 850 nm and 630 nm, approximately 50% will be reflected by the filter 57 and will be effectively lost or ignored, and the other 50% will pass through the filter 57 and enter the prism 23.

As to the radiation at each of the three wavelengths which does enter the prism 23, this radiation will all be propagating through the prism 23 along the portion 97 of the optical path 12. With reference to FIG. 1, this radiation will then travel along the path of travel 12 in FIG. 1. It will be successively reflected by the surfaces 34, 33, 32 and 31 as it travels through the prisms 23, 22 and 21, and will then pass through the lenses 18, 17 and 16, and travel to the scene 13.

A typical scene 13 will reflect some of the energy at each wavelength back along the path 12. This reflected energy will travel through the lenses 16-18 and the prisms 21–23, and will reach the filter 57. With reference to FIG. 2, approximately 50% of the energy at each of the wavelengths 630 nm and 850 nm will pass through the filter filter 57, and will be effectively ignored or lost. The other 50% of the energy at each of the wavelengths of 630 nm and 850 nm will be reflected by the filter 57 so as to be propagating in the direction 98, and will travel along the path of travel 12 to the eye 14 of the user. As to the radiation with a wavelength of 1550 nm, virtually none of this radiation will be reflected by the filter 57. Instead, nearly 100% of this radiation will pass through the filter 57 and will enter the optical fiber 52. It will then travel through the optical fiber 52 to the circulator 77, which will route it with a high degree of optical efficiency into the optical fiber 87, and thus to the detector 71.

It will be helpful to now briefly discuss each wavelength separately. Beginning with the wavelength of 1550 nm, the circuit 73 can use the laser diode 61 to emit a pulse of infrared radiation having the wavelength of 1550 nm. This pulse then travels through the multiplexer 67, the circulator 77 and the filter 57, and into the prism 23. It then travels along the path of travel 12 and out of the sight 10 to the scene 13, where some of the energy of the pulse is reflected. This reflected energy with the wavelength of 1550 nm then travels back along the path of travel 12 until it is in the prism 23 and reaches the filter 57. Virtually none of this returning energy is reflected by the filter 57. Instead, almost 100% of this energy passes through the filter 57 and into the fiber 52, and then is directed by the circulator 77 to the detector 71. The circuit 73 can determine the time interval which elapses between transmission of the pulse by the laser diode 61 and reception of the reflected pulse by the detector 71, and can then use known techniques to calculate the distance or range from the sight 10 to the scene 13.

Turning to the wavelength of 630 nm, the laser diode 63 outputs visible radiation at this wavelength, which passes through the multiplexer 68, multiplexer 67, and circulator 77, and eventually reaches the filter 57. Approximately 50% of this energy will reflected by the filter 57, and will be effectively ignored. The other 50% of the energy travels out of the sight 10 along the path of travel 12, until it reaches the scene 13. A portion of this energy at the wavelength of 630 nm will be reflected by the scene 13, and will travel back along the path of travel 12 until it reaches the filter 57. Approximately 50% of this reflected energy will pass through the filter 57, and will be effectively ignored. The other 50% will be reflected, and will continue propagating along the path of travel 12 until it reaches the eye 14 of the user. As a result, the user can see a small dot or pointer of visible laser light, which is being projected onto the scene 13. The user can move the weapon carrying the sight 10, in order to position this visible dot or pointer on a portion of the scene 13 which represents a target that the user wishes to hit with a bullet or other projectile from the weapon.

As to the wavelength of 850 nm, the laser diode 62 emits infrared radiation at this wavelength. The purpose and use this radiation is similar to that of the radiation from the laser diode 63. The fundamental difference is that one beam is infrared radiation, and the other beam is visible radiation. In more detail, the radiation from the laser diode 62 passes through the multiplexers 68 and 67, and through the circulator 77. When it reaches the filter 57, approximately 50% of the energy is reflected, and is then effectively ignored. The remaining 50% of the energy passes through the filter 57, and then propagates out of the sight 10 along the path of travel 12, until it reaches the scene 13. A small portion of this radiation at wavelength 850 nm is reflected by the scene 13, and travels back along the path of travel 12 until it reaches the filter 57. Approximately 50% of this reflected energy passes through the filter 57, and is effectively ignored. The remaining 50% is reflected by the filter 57 so that it travels in the direction 98, and then propagates to the eye 14 of the user. Since this is infrared radiation, which is not normally visible to the naked eye 14, the user can wear special glasses of a known type in order to see this infrared radiation. Alternatively, the eyepiece of the sight 10 can be configured to be a detachable assembly, which can be replaced with a substitute assembly that will make this infrared radiation, and also the visible radiation from the scene 13, visible to the eye 14 of the user. In either case, what the user will see is a small dot or pointer, which is being projected onto the scene 13. The user can move the weapon carrying the sight 10 in order to position this dot or pointer on a portion of the scene 13 which represents a target that the user wishes to hit with a bullet or other projectile.

The disclosed embodiment includes laser diodes 62 and 63 that respectively produce both infrared and visible radiation, because there are applications where it is desirable to have a sight 10 with both infrared and visible pointers. However, for other applications, it would optionally be possible to omit either one or both of the laser diodes 62 and 63, so as to provide a sight with only a visible pointer, only an infrared pointer, or no pointer at all. If either of the laser diodes 62 and 63 is omitted, then the multiplexer 68 would also be omitted. In addition, if the laser diodes 62 and 63 are both omitted, then both of the multiplexers 68 and 67 can be omitted.

Through use of the non-reciprocal optical element 77, the outbound and inbound laser pulses of the laser rangefinder can all pass through a single common optical aperture, while achieving a high degree of optical efficiency, and while avoiding the cost of multiple apertures or high-speed optical switches and associated circuitry. This permits the laser rangefinder to be compact and lightweight. Further, by avoiding optical switches and the associated control electronics, battery life is extended for a portable sight, such as the sight 10 of FIG. 1.

In addition, through the use of wavelength division multiplexers, one or more pointers in either or both of the visible and infrared spectrums can be implemented, and can use the same optical aperture as the laser rangefinder, and with a suitable degree of optical efficiency. A further consideration is that, through the use of fiber optics for inbound and outbound laser beams, excellent flexibility is provided for incorporating the invention into the free space available within existing weapon sights. Consequently, with only minimal redesign, structure providing enhanced functionality can be easily retrofit into previously-manufactured sights, and/or can be easily assembled into new sights at the factory. The invention permits a single compact housing with a single optical aperture to contain each of several distinct functional capabilities, including an optical weapon sight, a laser rangefinder, and one or more laser pointers.

Although one embodiment has been illustrated and described in detail, it will be understood that various substitutions and alterations are possible without departing from the spirit and the scope of the invention, as defined by the following claims.

What is claimed is:

1. An apparatus comprising a rangefinder portion that includes:
    a radiation generator which emits radiation having a selected wavelength;
    a radiation detector which detects radiation having said selected wavelength; and
    an optical portion which includes a non-reciprocal optical part, said optical portion routing radiation emitted by said radiation generator at said selected wavelength through said non-reciprocal optical part and then through an aperture toward a location remote from said apparatus, and routing radiation received through said aperture at said selected wavelength through said non-reciprocal optical part and then to said radiation detector.

2. An apparatus according to claim 1, wherein said optical portion includes an optical fiber positioned so that radiation at said selected wavelength which is traveling between said aperture and said non-reciprocal optical part passes through said optical fiber.

3. An apparatus according to claim 1, wherein said non-reciprocal optical part includes a circulator having first, second and third ports that respectively communicate optically with said radiation generator, said radiation detector, and said aperture.

4. An apparatus according to claim 1, including a flanker generator which emits radiation at a further wavelength different from said selected wavelength, said optical portion including a wavelength multiplexing portion which produces multiplexed radiation by combining radiation from said radiation generator with radiation from said further generator before said radiation from said radiation generator passes through said non-reciprocal optical part, said optical portion routing said multiplexed radiation through said non-reciprocal optical part and then through said aperture.

5. An apparatus according to claim 4, including a weapon sight, said rangefinder portion being part of said weapon sight.

6. An apparatus according to claim 4,
    including an eyepiece portion; and
    wherein said optical portion includes a thin-film structure which is disposed optically between said aperture and said non-reciprocal optical part, said thin-film structure being highly transmissive to radiation having said selected wavelength, and being partially transmissive and partially reflective to radiation having said further wavelength, said thin-film structure reflecting along an optical path toward said eyepiece at lout a portion of visible radiation received through said aperture, and a portion of radiation received at said further wavelength through said aperture.

7. An apparatus according to claim 4, including an additional generator which emits radiation having an additional wavelength different from each of said selected wavelength and said further wavelength, said wavelength multiplexing portion producing said multiplexed radiation by combining radiation from said additional generator with radiation from said further generator and radiation from said radiation generator.

8. An apparatus according to claim 7,
    wherein said selected wavelength and one of said further and additional wavelengths are in the infrared spectrum; and
    wherein the other of said further and additional wavelengths is in the visible spectrum.

9. An apparatus according to claim 7,
    including an eyepiece portion; and
    wherein said optical portion includes a thin-film structure which is disposed optically between said aperture and said non-reciprocal optical part, said thin-film structure being highly transmissive to radiation having said selected wavelength, and being partially transmissive to radiation having either of said further and additional wavelengths, said thin-film structure reflecting along an optical path toward said eyepiece at least a portion of visible radiation received through said aperture, a portion of radiation received at said further wavelength through said aperture, and a portion of radiation received at said additional wavelength through said aperture.

10. A method comprising effecting range finding by:
    emitting radiation having a selected wavelength from a radiation generator,
    detecting radiation having said selected wavelength with a radiation detector;
    routing radiation emitted by said radiation generator at said selected wavelength through a non-reciprocal optical pan and then through an aperture toward a remote location; and
    routing radiation received through said aperture at said selected wavelength through said non-reciprocal optical part and then to said radiation detector.

11. A method according to claim 10, including positioning an optical fiber so that radiation at said selected wavelength which is traveling between said aperture and said non-reciprocal optical part passes through said optical fiber.

12. A method according to claim 10, including selecting as said non-reciprocal optical part a circulator having first, second and third ports that respectively communicate optically with said radiation generator, said radiation detector, and said aperture.

13. A method according to claim 10, including:
    emitting radiation from a further generator at a further wavelength different from said selected wavelength;
    producing multiplexed radiation by combining radiation from said radiation generator with radiation from said further generator before said radiation from said radiation generator passes through said non-reciprocal optical part; and
    routing said multiplexed radiation through said non-reciprocal optical part and then through said aperture.

14. A method according to claim 13,
including emitting additional radiation from an additional generator at an additional wavelength which is different from each of said selected wavelength and said further wavelength; and
wherein said combining includes combining radiation from said additional generator with radiation from said further generator and radiation from said radiation generator.

15. A method according to claim 14,
including selecting said selected wavelength and one of said further and additional wavelengths to be in the infrared spectrum; and
selecting the other of said further and additional wavelengths to be in the visible spectrum.

16. An apparatus comprising rangefinder means for determining a range, said rangefinder means including:
radiation generator means for emitting radiation having a selected wavelength;
radiation detector mean for detecting radiation having said selected wavelength; and
optical means for muting radiation emitted by said radiation generator means at said selected wavelength through a non reciprocal optical part and then through an aperture toward a location remote from said apparatus, and for routing radiation received through said aperture at said selected wavelength through said non-reciprocal optical part and then to said radiation detector means.

17. An apparatus according to claim 16, wherein said non-reciprocal optical part includes circulator means having first, second and third ports that respectively communicate optically with said radiation generator means, said radiation detector means, and said aperture.

18. An apparatus according to claim 16, including further generator means for emitting radiation at a further wavelength different from said selected wavelength, said optical means including wavelength multiplexing means for producing multiplexed radiation by combining radiation from said radiation generator means with radiation from said further generator means before said radiation from said radiation generator means passes through said non-reciprocal optical part, said optical means routing said multiplexed radiation through said non-reciprocal optical part and then through said aperture.

19. An apparatus according to claim 18, including additional generator means for emitting radiation having an additional wavelength different from each of said selected wavelength and said further wavelength, said wavelength multiplexing means producing said multiplexed radiation by combining radiation from said additional generator means with radiation from said further generator moans and radiation from said radiation generator means.

* * * * *

UNITED STATES PATENT AND TRADEMARK OFFICE
CERTIFICATE OF CORRECTION

PATENT NO. : 7,230,684 B2  
APPLICATION NO. : 10/962134  
DATED : June 12, 2007  
INVENTOR(S) : John R. Staley, III and Frank C. Sulzbach It is certified that error appears in the above-identified patent and that said Letters Patent is hereby corrected as shown below:

Claim 4, Column 9, line 48, the word "flanker" should read as --further--.  
Claim 6, Column 10, line 3, the word "lout" should read as --least--.  
Claim 10, Column 10, line 44, the word "pan" should read as --part--.  
Claim 16, Column 11, line 20, the word "mean" should read as --means--.  
Claim 16, Column 11, line 22, the word "muting" should read as --routing--.  
Claim 19, Column 12, line 26, the word "moans" should read as --means--.

Signed and Sealed this

Seventh Day of August, 2007

JON W. DUDAS  
*Director of the United States Patent and Trademark Office*